April 20, 1954 A. SNIJDERS 2,676,204

PULSE DEMODULATING CIRCUIT

Filed Feb. 14, 1952 2 Sheets-Sheet 1

INVENTOR.
ANTONIE SNIJDERS
BY Hugh A. Kirk

INVENTOR:
ANTONIE SNIJDERS.
BY Hugh A Kirk
ATTY.

Patented Apr. 20, 1954 2,676,204

UNITED STATES PATENT OFFICE 2,676,204

PULSE DEMODULATING CIRCUIT

Antonie Snijders, The Hague, Netherlands, assignor to Staatsbedrijf der Posterijen, Telegrafie en Telefonie, The Hague, Netherlands Application February 14, 1952, Serial No. 271,570

14 Claims. (Cl. 178—66)

This invention relates to a pulse demodulating circuit for high frequency carrier telegraphy. More particularly, it deals with a circuit for the demodulation of successive mark and space, off and on, or tone and no-tone, telegraphic code pulses which are amplitude modulated on a fixed frequency carrier wave. Since the high frequency carrier wave may be one of several such carrier waves each corresponding to a different telegraphic code channel being communicated simultaneously over the same wire or circuit, and such carrier waves are separated from each other by band pass filters, the resulting separated received carrier modulated wave becomes somewhat distorted by such filters, and its pulses do not then have the steep leading and trailing edges they had when originally modulated for transmission. Therefore, the demodulating circuit of this invention reshapes the pulses received so that their proper and exact duration and time spacing are reproduced.

The circuit of this invention is similar to that demodulating circuit described and disclosed in the prior co-pending U. S. patent application of W. H. van Zoost, Serial No. 210,136, filed February 9, 1951, and entitled Receiver for Voice Frequency Telegraph Systems, assigned to Staatsbedrijf der Posterijen, Telegrafie en Telefonie of the Netherlands. This prior demodulator included a bias registering condenser which was connected in such a way as to lose its charge within a short period of time in the event no signal pulses were received, which correspond to a stop polarity for the telegraph circuit connected to the demodulator. This prior demodulator also was connected so that the bias registering condenser could be charged to a higher value than the half amplitude of the signal voltage. It has been found that these connections had disadvantages and could produce distortion and possible errors in the demodulated signal.

Accordingly it is an object of the present invention to produce an improved pulse amplitude demodulating circuit with automatic level compensation in a simple, efficient, effective and economic manner that overcomes the disadvantages of the circuit of said prior application Serial No. 210,136.

Another object is to produce such a demodulator in which the correct time length pulse signals are produced without distortion, regardless of the distortion which may be caused by a band pass filter in the carrier wave for the pulse modulated signal.

Another object is to produce such a demodulator which will retain a no-tone condition for a reasonable length of time without producing distortion, in the event that, for example, about six no-tone pulses in succession are received.

Another object is to produce a demodulator having a bias registering condenser which rapidly charges at the full signal voltage and slowly discharges, but which is scanned at the half signal voltage to obtain the proper time length of the pulse signals being demodulated.

Generally speaking, the demodulating circuit of this invention comprises a detector, a bias registering circuit and a scanning circuit with automatic level compensation. The detector may be conventional, such as a full wave rectifier in which the amplitude of the receiver carrier wave is rectified, and then the rectified wave may be smoothed out, such as by a condenser and load resistance across the output of the rectifier, to produce a wave of gradually varying amplitude corresponding to the pulses modulated thereon.

In order to divide this wave of gradually varying amplitude into a wave of definite off and on, or space separated, pulses with steep leading and trailing edges of definite duration and spacing, this wave is passed through a bias registering circuit in which the mid-point between the maximum and minimum amplitude of the wave undulations are the point at which the reformed and demodulated pulses are timed and spaced. This is accomplished by a condenser and diode or rectifier in series across the output of the detector circuit, and a pair of equal resistances in series with each other and in parallel with said condenser. The mid-terminal or junction between said pair of equal resistances, is connected to one of the two input terminals of the following scanning device, and the opposite terminal of the diode from that connected to said condenser, is connected to the other input terminal of said scanning device. By this arrangement, the full amplitude of the signal wave is applied to said bias registering condenser, and said condenser is discharged through twice the signal biasing resistance, so that the disadvantages mentioned above in the circuit described in the previously mentioned prior application Serial No. 210,136 are avoided.

The scanning device may comprise a pair of electron discharge tubes, such as triodes, the grids of which are connected to the two input terminals to the device, one of which input terminals may be biased at one fixed potential corresponding to the half amplitude of the full signal voltage, and the other responsive to the varying potential of the signal. In the anode circuit of this pair of scanning tubes, there may be provided opposing coils of a polarized relay, which coils are energized in accordance with the conductivity of said tubes, to operate a definite "off" and "on" switch which may connect either positive or negative potential to the receiving telegraph circuit. Thus, the signals which are demodulated are definitely reproduced again in time length and spaced telegraphic pulses corresponding exactly to the timing of the original telegraphic code pulses transmitted.

The above mentioned and other features and objects of this invention and the manner of attaining them are given more specific disclosure in the following description of an embodiment of this invention taken in conjunction with the accompanying drawings, wherein.

Figure 2:
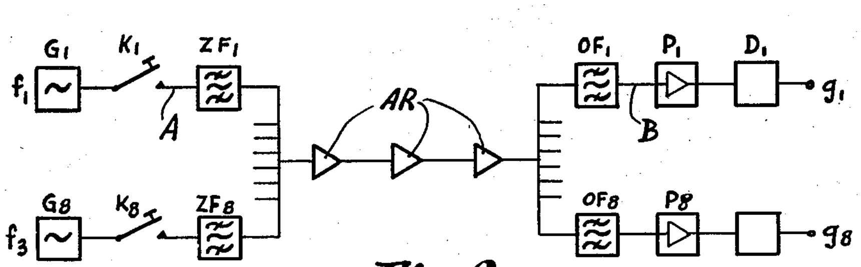
Fig. 2 is a schematic block diagram of a multichannel telegraphic communication system in which demodulators of the type shown in Fig. 1 may be employed.
Figure 3:
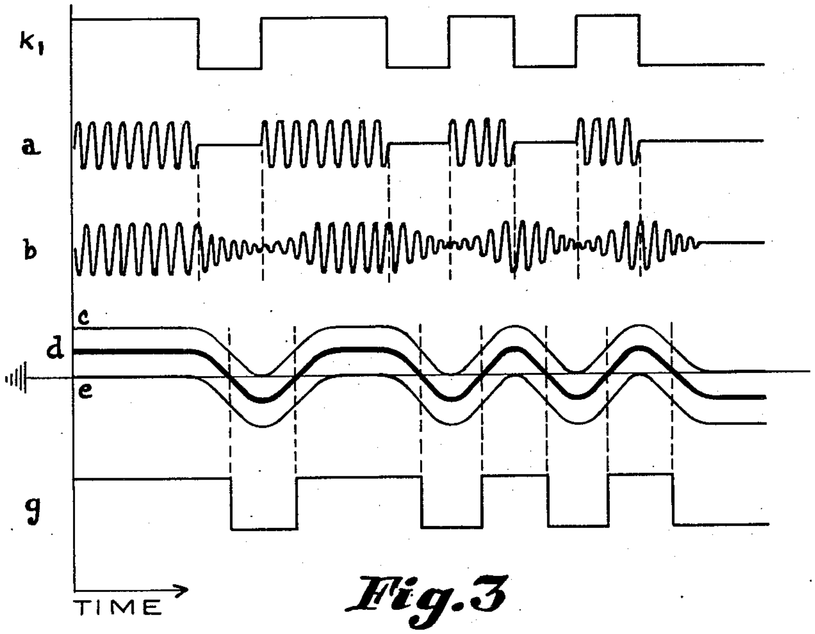
Fig. 3 is a time amplitude signal wave diagram of a series of pulse signals as they occur in the different parts of the system circuits shown in Figs. 1 and 2.

Referring first to Fig. 2, the demodulator of the present invention may be employed to advantage in the system for demodulating telegraphic pulses from a carrier wave of a given frequency which may be transmitted over a common circuit with a plurality of other signals modulated on different fixed frequency carrier waves. Thus, as shown to the left in Fig. 2, there may be, say for example, an eight channel telegraph system, having eight separate frequency generators G1–G8 producing correspondingly different constant frequencies of f1–f8. Each one of these frequency waves are then modulated or interrupted corresponding to definite pulses by the telegraph transmitting keys K1–K8, so that an interruption of the circuit according to the wave $k_1$ shown in Fig. 3, would interrupt the frequency f1 according to the wave *a* which would occur at the point A shown in Fig. 2. This carrier wave then passes through a band pass filter ZF1 corresponding to the transmission of frequency f1 where it is joined in multiple with the other seven different frequency carrier waves corresponding to the other channels of the eight channel system. The purpose of the band pass filters ZF1–ZF8 is to limit the frequency spectrum of waves to each band and to prevent the signal from one of the channels being transmitted back into one of the other channels in the event that two or more of the keys K1–K8 may be closed at the same time, thus preventing short circuits or cancellation of one or more of the signals. The combined carrier waves may then be transmitted through amplifiers and/or repeaters AR in a common circuit to the receiving stations which are shown to the right in Fig. 2. These received waves may be passed through corresponding receiving band pass filters OF1–OF8, each of which passes one of the carrier frequencies f1–f8, respectively. Thus, for example, at point B a wave similar to *b* shown in Fig. 3 is produced which may have been distorted as shown from that of wave *a* due to the filter circuits ZF1 and/or OF1, and possibly also the repeater AR. This distortion is caused in part by the time constant circuits in these circuits which decrease the abruptness of the pulses so that the envelope of the amplitude modulated wave *b* is gradually undulating and corresponds to the curves *c*, *d* and *e* shown in Fig. 3. However, before the received modulated signal *b* is demodulated, it may be passed through a suitable amplifier such as the amplifier P1 and then passed into the demodulator D1 wherein the wave *b* is reformed and/or demodulated into a wave similar to wave *g* shown in Fig. 3, corresponding to the wave k1 with respect to the time length of the spaces and pulses.

Figure 1:
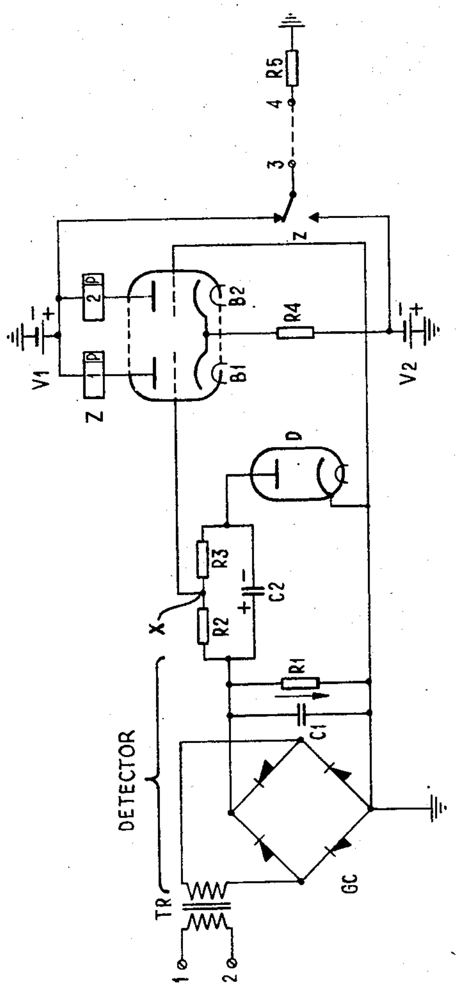
Fig. 1 is a schematic wiring diagram of a demodulating circuit according to one embodiment of this invention.

In Fig. 1 there is shown a circuit diagram of one of the demodulator circuits D1–D8, in which the amplified modulated carrier wave corresponding to wave *b* of Fig. 3 is applied across the terminals 1 and 2 of the connecting transformer TR to be applied first to a detecting circuit. This detector may, for example, comprise a full wave rectifier GC, which may be composed of rectifier cells or diodes connected according to the well known full-wave bridge-rectifier circuit of Graetz. Any distorting effect which might arise from the cut-off plate voltages of diodes which may be employed in the circuit GC instead of rectifier cells, may be entirely avoided by using grid cathode combinations of triodes with gilded control grids. Across the outputs of this bridge circuit, there may be connected a smoothing circuit comprising a condenser C1 and a load resistance R1 in parallel with each other. Thus, at the output of this detector, or across the terminal of the load resistor R1, a wave signal corresponding to wave *c* in Fig. 3 is produced.

This output is then applied to a bias registering circuit, which herein comprises a bias registering condenser C2 and a rectifier or diode D, in series with each other and connected across the output terminals of the detector or across load resistor R1. Also, connected in series with each other and in parallel across the condenser C2 are a pair of equal resistances, or resistors R2 and R3, which for example, may be chosen to have a value of $2 \times 10^6$ ohms each, so that any charge which may be rapidly placed on the condenser C2, can only slowly discharge through both the resistances R2 and R3. The value of the equal resistances R2 and R3 are so selected that the bias registering condenser C2 will maintain its charge for a period corresponding to that for the successive transmission of about 6 no-tone pulses before being discharged through the resistances R2 and R3. Since the present system is based on the principle of an amplitude tone corresponding to stop polarity in the finally demodulated signal and no-tone corresponding to start polarity, the maintaining of the charge on the condenser C2 for such a length of time is important for the proper transmission of the signals, in that the average space between the signals will not usually be more than 2 or 3 times that of the normal pulse length or repetition rate. The charging time for the condenser C2, however, must be short, as it is by its flow connection through the diode D; but since the diode D acts as a rectifier, it blocks the discharge of the condenser C2 which must then accordingly discharge through the resistances R2 and R3. However, as soon as a new tone pulse is received, the discharge of the condenser C2 is immediately cancelled and it is recharged to the full voltage value of said new tone pulse.

It is necessary that the rectifier D has a high back resistance to prevent leakage of the charge on condenser C2 off through the low resistance R1. Accordingly a diode as shown in Fig. 1 is preferred for the rectifier D. Since the cathode of the diode D must be connected to the more negative terminal of the bias registering circuit, namely ground herein, the polarity of the input circuit from the detector GC is reversed from that normally employed and that shown in the above mentioned co-pending application Serial No. 210,136; namely the upper conductor of the output of the detector GC in Fig. 1 herein is positive with respect to the lower conductor which is connected to ground.

The junction or connecting point X between the two equal resistances R2 and R3 in parallel with the condenser C2 is connected directly to one of the two input terminals of a scanning device which may comprise the grid of one of a pair of scanning tubes B1 and B2, which scanning tubes may comprise the two halves of a double triode type tube. The other input terminal to the scanning device may be connected to the same terminal of the output of the detector as the cathode, or one terminal of the rectifier diode D remote from said bias registering condenser C2, which may be maintained at a given fixed potential, say for example, at ground potential as shown.

If a tone or high amplitude portion of the wave *c* corresponding to "stop" polarity is received and applied to the left hand plate of the condenser C2, a current flows through the load resistor R1 in a direction corresponding to that of the arrow shown alongside of said load resistance, and the condenser C2 receives the full voltage charge of the signal. The scanning tube B1 then receives a control grid bias which is positive with respect to ground potential or that potential applied to the grid of scanning tube B2. Some grid current flow does not influence the charge of the bias registering condenser C2, because said grid "sees" only the equal resistances R2 and R3 in each direction. As a result tube B1 has a larger anode current than that of tube B2 so that the coil Z1 of the polarized relay Z is energized, and causes a positive potential to be connected through its armature *z* from a battery V1 to the terminal 3, as shown in Fig. 1.

If a no-tone signal corresponding to "start" polarity is received across the output of the detector, the resulting diminishing amount of current passing through the load resistor R1 falls to zero or ground potential. Condenser C2, however, retains its charge of tone potential which corresponds to the peak value of the receive signal, and only slowly discharges through both resistors R2 and R3, when the current flowing through the resistance R1 by the no-tone signal has reduced to half its value. At this instant, the control grid of the scanning tube B1 has a potential equal to that of the potential of scanning tube B2. Referring now to the waves *c* and *e* in Fig. 3, the wave *c* may correspond with the potential variations on the left plate of condenser C2, and that of curve *e* to those on the right plate of condenser C2, while the heavy line wave *d* corresponds to the potential taken from the junction X midway between the potentials of curves *c* and *e*. Thus, when the potential applied to the grid of the scanning tube B1 is half way between the maximum and minimum amplitude of the demodulated signal from the detector or the retained charge on the bias registering condenser C2, or when this wave *d* reaches ground potential or that potential at which the grid of tube B2 is maintained, the current through tube B1 decreases to and then below that flowing through tube B2 so that the energized coil Z2 of polarized relay Z controls the movement of the armature *z* to its other position than that shown in Fig. 1, and negative potential from a battery V2 is applied to the output terminal 3.

Comparing the waves *d* and *g* in Fig. 3, that point where the curve *d* crosses the horizontal ground potential line, the switching over of the current passing through scanning tubes B1 and B2 and their respective coils of the relay Z, produces an output signal across terminals 3 and 4 corresponding to a definite "off" and "on", positive and negative, or presence and absence of steep leading and trailing edged pulses of wave *g* in Fig. 3, corresponding in time spacing and duration to the pulses in wave *k*1.

Similarly, when the next tone impulse is received by the detector and the potential rises again at the junction X in Fig. 1 to and above biasing or ground potential, the current flowing through scanning tube B1 again becomes greater than that through tube B2 and the armature *z* switches back into the position shown in Fig. 1. Accordingly, the present circuit detects the half way or half amplitude value mark of the varying signals being received, and compensates for any distortion in their sharpness due to the band pass filters through which the carriers for the signals must pass before the wave is demodulated.

The disadvantages of the circuit of the above mentioned copending application Serial No. 210,136 have now been overcome by the bias registering circuit portion of the present invention in which equal resistances are applied to each side of the grid of one of the scanning tubes, namely tube B1, and the full wave or full potential value of the signal wave is applied across the bias registering condenser C2. The slow discharge of the condenser C2 does not affect the bias on the grid of the scanning tube B1, nor will the charge on said condenser C2 be affected by any reverse grid current flow in the scanning tube, since this grid "sees" equal resistances R2 and R3 in both positive and negative potential directions. Furthermore, any leakage between the cathode and heater of a diode rectifier tube D will not materially affect the potential at the point X due to the presence of the resistance R3.

While there is described above the principles of this invention in connection with specific apparatus, it is to be clearly understood that this description is made only by way of example and not as a limitation to the scope of this invention.

What is claimed is:

1. In an amplitude pulse demodulating circuit having a pulse detector, a rectifier and a bias registering condenser in series across the output of said detector, and a scanning device having two conditions corresponding to pulses and absence of pulses, the improvement comprising: a pair of equal resistances connected in series across said condenser, and a junction between said resistances connected to said scanning device, whereby said bias registering condenser is quickly charged to the full amplitude of the pulse voltage from said detector, and said condenser may maintain its charge for at least the time required for the transmission of about six normal pulses to bridge any normal no-pulse time-gap in the transmission of a signal.

2. In an amplitude pulse demodulating circuit having a detector, a rectifier having two terminals, a bias registering condenser, said rectifier and said condenser being connected in series across the output of said detector, and a scanning device having two input terminals and two conditions corresponding to pulses and absence of pulses, the improvement comprising: a pair of equal resistances connected in series across said condenser, and a junction between said resistances connected to one of said input terminals of said scanning device, with the terminal of said rectifier remote from said condenser being connected to the other of said input terminals of said scanning device, whereby said scanning device changes its condition corresponding to the polarity of the voltage applied across its said input terminals at half way between the maximum and minimum voltages of the signal received from said detector and applied directly to said condenser.

3. An amplitude pulse demodulating circuit comprising: a detector, a rectifier, a bias registering condenser, said rectifier and said bias registering condenser being connected in series across the output of said detector, a scanning device having two conditions corresponding to pulses and absence of pulses, a pair of equal resistances connected in series with each other across said condenser, and a junction between said resistances connected to said scanning device, whereby said scanning device changes its conditions at the mid-potential level of the amplitude modulated pulses from said detector.

4. A circuit according to claim 3 wherein said detector comprises a full wave rectifier circuit and a smoothing circuit.

5. A circuit according to claim 4 wherein said full wave rectifier comprises diodes arranged in a bridge circuit.

6. A circuit according to claim 4 wherein said smoothing circuit comprises a condenser and a load resistance in parallel with each other across the output of said full wave rectifier circuit.

7. A circuit according to claim 3 wherein said rectifier comprises a diode.

8. A circuit according to claim 3 wherein said scanning device comprises a pair of triodes having anodes, and a polarized relay having two coils, each one of which is connected to one of said anodes.

9. A circuit according to claim 8 including an armature operated by said polarized relay, and positive and negative potential sources alternately connected by said armature to a common output terminal.

10. A circuit according to claim 3 adapted for a telegraph transmission system for the communication of a plurality of signals simultaneously, each of which signals is modulated on separate frequency carrier waves, including band pass filters for the separation of said carrier waves.

11. An amplitude pulse demodulating circuit comprising a detector, a diode having a cathode, a bias registering condenser, said diode and said condenser being connected in series across the output of said detector, a scanning device having two input terminals and two conditions corresponding to pulses and absence of pulses, a pair of equal resistances connected in series across said condenser, and a junction between said resistances connected to one of said input terminals of said scanning device, with the cathode of said diode remote from said condenser being connected to the other of said input terminals of said scanning device, whereby said scanning device changes its condition corresponding to the polarity of the voltage applied across its input terminals at half way between the maximum and minimum voltages of the signal received from said detector and applied directly to said condenser.

12. A pulse demodulating circuit comprising: a detector, a rectifier, a bias registering condenser, said rectifier and said bias registering condenser being connected in series across the output of said detector, an output device responsive to pulses and absence of pulses, a pair of equal resistances connected in series with each other across said condenser, and a junction between said resistances connected to said output device.

13. A circuit according to claim 12 wherein said rectifier comprises a diode.

14. A circuit according to claim 12 wherein said output device is a scanning device and comprises a pair of triodes having anodes and a polarized relay having two coils, each one of which is connected to one of said anodes.

References Cited in the file of this patent

UNITED STATES PATENTS

| Number | Name | Date |
|---|---|---|
| 2,470,573 | Moore | May 17, 1949 |
| 2,470,722 | Rattner | May 17, 1949 |